Patented Sept. 20, 1927.

1,642,856

UNITED STATES PATENT OFFICE.

MORRIS P. HOLMES, OF CLAREMONT, NEW HAMPSHIRE, ASSIGNOR TO SULLIVAN MACHINERY COMPANY, A CORPORATION OF MASSACHUSETTS.

SPROCKET.

Application filed March 8, 1924. Serial No. 697,940.

This invention relates generally to sprockets for mining machines and more particularly to a sprocket and sprocket bearing for a cutter chain used thereon.

It is an object of this invention to provide an improved sprocket and more particularly an improved chain sprocket especially adapted to use with mining machine cutter chains. A further object is to provide an improved sprocket bearing. A still further object is to provide improved means for accomplishing the previous object, and also positioning the sprocket while at the same time rendering the sprocket bearing dust proof.

In the accompanying drawings I have shown for purposes of illustration one form which my invention may assume in practice.

In these drawings,—

Fig. 1 is a fragmentary plan view of the forward portion of a cutter bar embodying my invention.

Fig. 2 is a developed transverse section on line 2—2 of Fig. 1.

Fig. 3 is a detail view of one of the locking rings.

Fig. 4 is an enlarged detail of the relation of the locking ring to the sprocket and bearing therefor.

In this illustrative construction I have shown my invention used in connection with a usual cutter bar 1 of a mining machine which employs a cutter chain 2 guided at the forward end of the cutter bar as by an idler sprocket 3 rotatably mounted within a suitable bearing structure to be described. It will, however, of course be understood that my invention may be used in connection with a sprocket located at either end of the chain or bar.

The cutter bar 1 is shown as comprising upper and lower plates 4 and 5 which are spaced at their forward end by an inner annular bearing member 6 through which bolts 7 pass to hold said bearing member and plates 4 and 5 in rigid relation. Projecting inwardly from the plates 4 and 5 are annular members 8 adapted to form annular recesses 9 within which is disposed an outer bearing member 10 having an original tight fit with the sprocket 3 keyed thereto as by a key 12, roller bearings 13 being disposed between the inner and outer bearing members 6 and 10 respectively. Disposed within the annular recesses 9 and at the ends of the bearing 10 are bearing rings 14 upon which the weight of the sprocket or other downward and upward forces will bear. In order to prevent dirt or other foreign material from gaining access to the bearings 13 I have provided a suitable dust proof structure comprising locking rings 15 seated within recesses 16 disposed adjacent the outer ends of the annular portions 8 and, being of resilient material, they will bear against members 8 and thereby prevent dirt from passing inwardly from the exterior thereof. It is to be noted that the inner edges of the members 15 are beveled so as to allow the same to be easily inserted within their respective grooves 16 without necessitating the thorough cleansing of these grooves. It is also to be noted, that as clearly shown in Fig. 4, the outer bearing member 10 is spaced slightly inwardly from the inner wall of the members 8, thereby letting the locking rings project outwardly beyond the periphery of the member 10 and thus be adapted to engage a portion of the sprocket 3. It will thus be seen that by my improved locking ring construction the tendency of the sprocket after long use to slip down and ride upon the surface of the member 8 is prevented, as the locking ring engages part of the sprocket and thereby prevents dropping and consequent excessive wear of the sprocket, the whole of the thrust being carried by the lower bearing member 14.

While I have in this application specifically described one form which my invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In combination, a support providing an annular groove, a rotatable member having an annular flange rotatably received in said groove, and ring means moving with said rotatable member resiliently engaging a lateral wall of said groove.

2. In combination, a support providing an annular groove, a rotating structure comprising an annular flange rotatively received

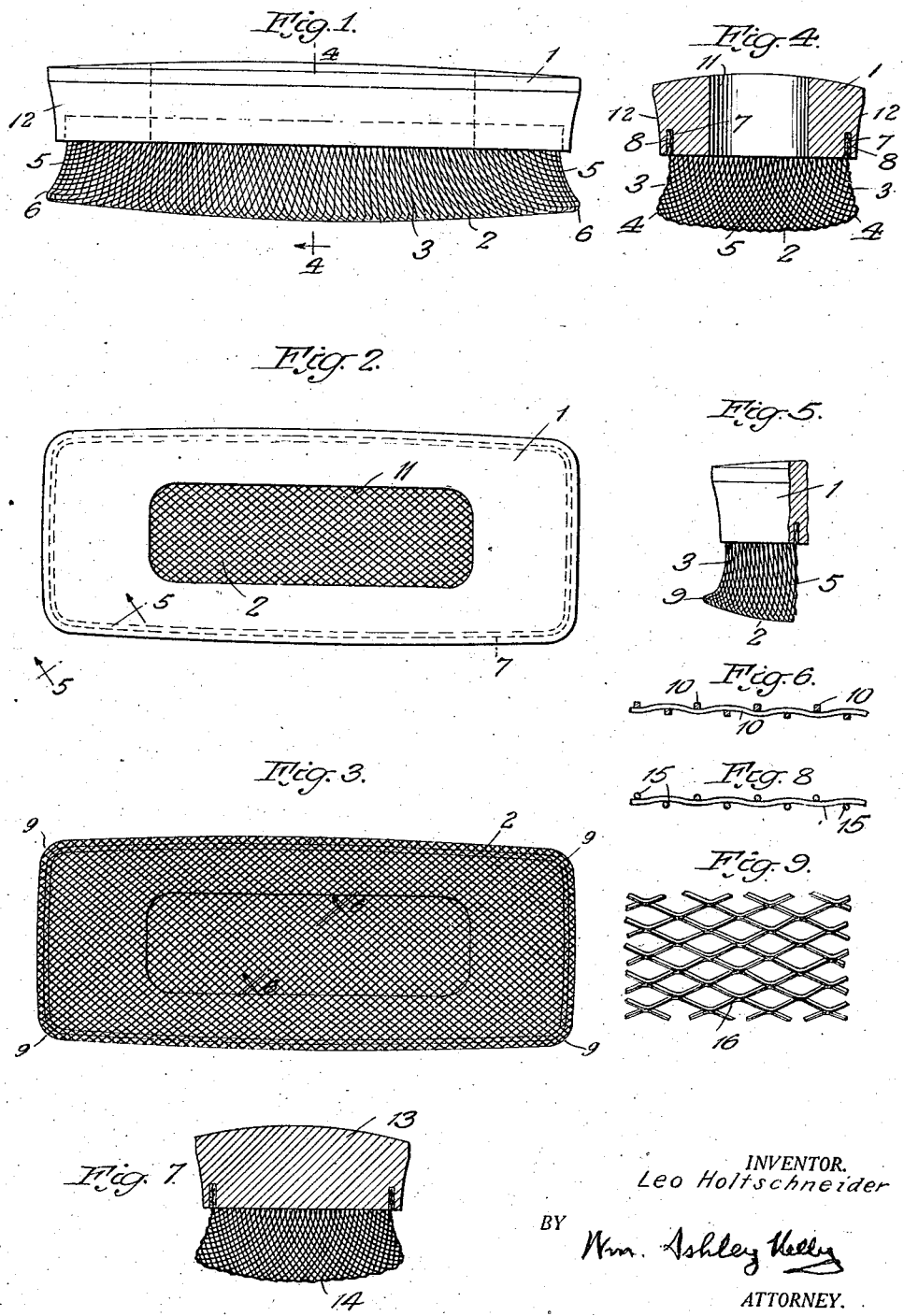

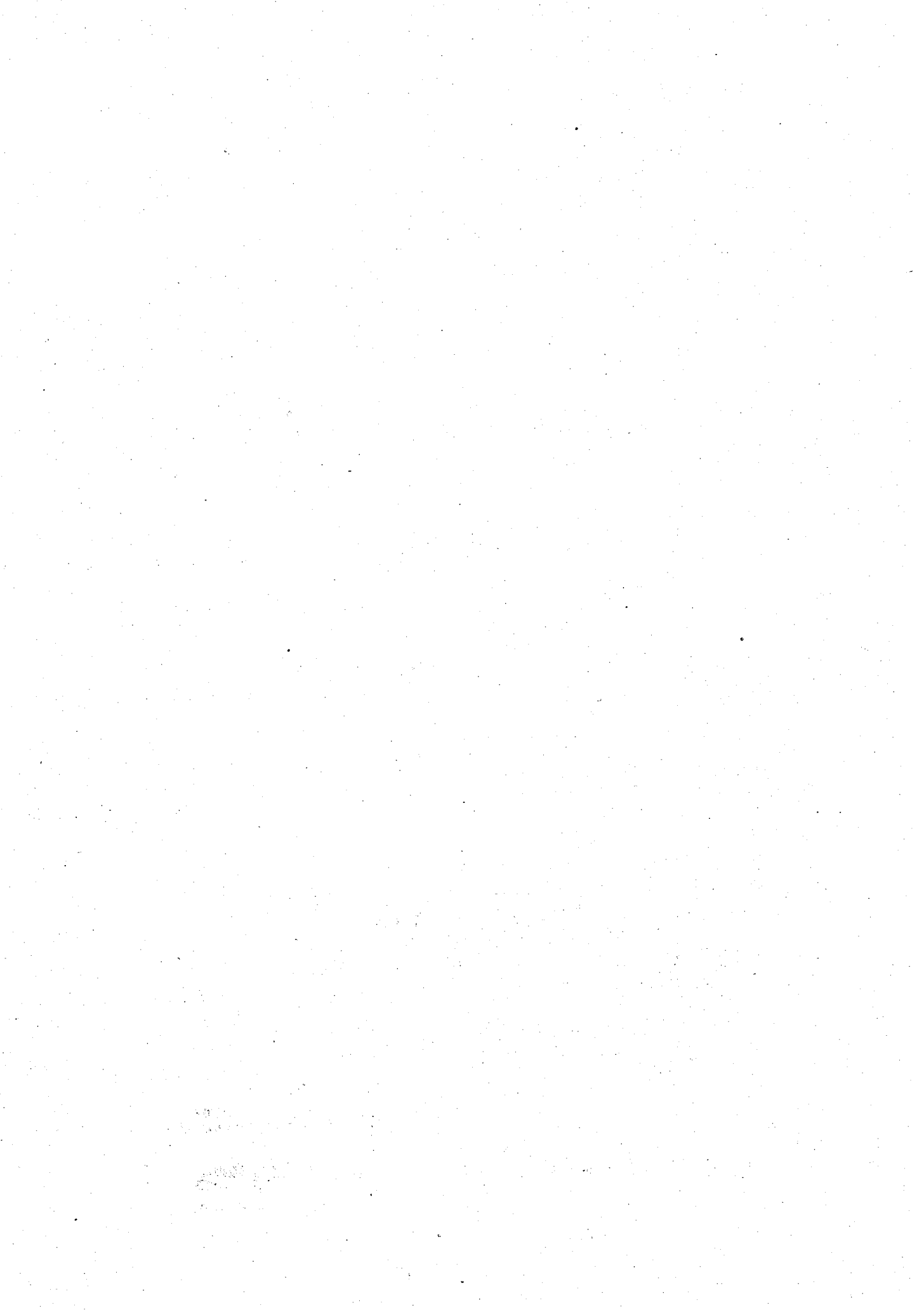

Patented Sept. 20, 1927.

1,642,857

UNITED STATES PATENT OFFICE.

LEO HOLTSCHNEIDER, OF PHOENIX, ARIZONA.

ABRADING BRUSH.

Application filed November 28, 1924. Serial No. 752,620.

This invention relates to brushes and the like for effecting abrasion and relates particularly to such devices for hand use.

Objects of the invention are to provide a brush which is highly effective, suitable for a wide variety of uses, convenient, durable, simple in construction and inexpensive to manufacture. Other and more particular objects and advantages of the invention will hereinafter appear.

According to the present invention a metallic abrading member is provided of the shape of a receptacle or box, in that it has a bottom portion surrounded by an uninterrupted wall, and this abrading member is of basket-like construction in that it is provided with foramina or meshes. In carrying out the invention the abrading member is formed from a single piece of suitable foraminated metallic sheet material, such as woven wire mesh fabric. This abrading member is secured around its edge to a suitable carrying part or supporting block which may form a handle for the brush, the upwardly extending wall portion of the abrading member serving as a spacing portion to space the bottom thereof from the handle block, so that an open space is provided within the self-sustaining abrading member, thereby permitting comminuted material removed by abrasion to pass to the inside and not clog the mesh, and also providing a desirable amount of resiliency in the abrading member.

As a feature of the invention, hereinafter set forth, the wires forming the mesh in the abrading member run diagonally to the direction in which the brush is to be moved in use, and in case the brush or its handle block is of oblong or elongated form, then the fabric is so arranged or disposed that the mesh-forming wires in the bottom of the abrading member run diagonally to the length and width of the brush or its handle block.

In carrying out the invention the mesh-forming wires may be non-angular and may be round in cross-section, or, as a feature of the present invention, these wires may have sharp abrading edges, and may be of angular cross-section, for example, square, so as to present sharp abrading angles or corners; the employment of fabric having round or having sharp-edged wires, in carrying out the present invention, being determined by the nature of the material to be operated upon.

In some cases, instead of the woven wire fabric in which the mesh-forming wires have sharp angles forming abrading edges, expanded metal could be employed, as the mesh of this material provides sharp square corners.

Also in carrying out the invention, it may in some cases be possible or desirable to employ yet other forms of foraminated metallic material.

The present invention also includes various features of construction and combinations of parts, as will appear from the following description.

The abrading brushes illustrated in the accompanying drawings as embodiments of the invention will now be described and thereafter the invention will be pointed out in claims.

Fig. 1, is a side elevation of an abrading brush embodying the invention.

Fig. 2, is a top or plan view.

Fig. 3 is an inverted plan or face view.

Fig. 4 is vertical transverse section on the line 4—4 of Fig. 1.

Fig. 5 is a diagonal elevation of one corner of the brush, and as viewed from the inclined line 5—5 of Fig. 2.

Fig. 6 is an enlarged partial diagonal section on the inclined line 6—6 of Fig. 3, and illustrates the sharp-angled square mesh-forming wires in the woven wire fabric employed in the abrading member of the brush.

Fig. 7 is a transverse section similar to Fig. 4, and shows a modified form of the invention.

Fig. 8 is an enlarged sectional view similar to Fig. 6, and illustrates the woven wire fabric employed in the abrading member of the brush shown in Fig. 7 as comprising smooth, round mesh-forming wires.

Fig. 9 is an enlarged partial face view, similar to Fig. 3, showing the abrading member of a modified brush, which in other respects may be of the same construction as that shown in Figs. 1 to 5 inclusive, and illustrates expanded metal employed in the abrading member to provide sharp abrading edges.

In the abrading brush illustrated as an embodiment of the present invention in Figs. 1 to 6 inclusive of the accompanying drawings, an oblong or elongated handle block 1, of suitable material, such as wood, shown as substantially rectangular with rounded corners, carries a correspondingly oblong or elongated round-cornered receptacle-shaped or box-shaped and basket-like abrading member formed, by a pressing or stamping operation, from a single piece of woven wire mesh fabric. The abrading member comprises a slightly bulged bottom 2, and a continuous or uninterrupted spacing portion comprising upwardly and slightly inwardly extending sides 3 which are continuous with and joined to the bottom 2 by curves forming rounded corners 4, and upwardly and slightly inwardly extending ends 5 which are continuous with and joined to the bottom 2 by curves forming rounded corners 6, the upper edge portion or margin of said spacing portion (comprising the joined sides 3 and ends 5) being vertical, as shown in the drawings. The abrading member is secured around its upper edge to the handle block 1, so that the bottom 2 is spaced a considerable distance from the handle block 1, and a large open space thereby provided at the inner side of or within the self-sustained abrading member. It is to be noted that the woven wire fabric is sufficiently stiff or rigid so that the abrading member will substantially retain its shape and whereby the bottom portion 2 will be maintained in spaced relation to the handle block 1.

For thus securing the abrading member to the handle block, the vertical upper edge portions of the joined sides 3 and ends 5, forming the spacing portion of the abrading member, are seated in a narrow and deep continuous or endless marginal groove or slot 7 in the lower side of the handle block 1 and are firmly held therein by means of a suitable adhesive 8, which should be waterproof, subject to only slight shrinkage, and have good adhesive qualities, and brown-stained white lead has proved satisfactory, but other suitable adhesives may be employed.

At each of the four corners of the abrading member, where the bottom 2, a side 3 and an end 5 come together, this corner portion of the woven wire mesh fabric is flattened so that thereby the fabric is bent upon itself on a short curve, as shown in Fig. 5, to form a substantially rigid corner projection 9, which projects corner-wise substantially horizontally and which is adapted to enter into any recesses or grooves in the object operated upon, for cleaning out such recesses, grooves, or depressions, or for abrasive action therein.

The interlaced mesh-forming wires 10 in the woven wire fabric forming the abrading member are provided with sharp abrading edges, and in the construction shown in the drawings these wires 10 are square in cross-section and have sharp corners, as is shown in Fig. 6, so that these angular corners form sharp abrading edges at the outer side of the abrading member. The wires 10 are preferably of hard steel so as to give them good wearing and abrading qualities.

It is to be noted that the mesh-forming wires 10 run diagonally or oblique to the direction in which the brush is to be moved in use. In the illustrated construction the woven wire mesh fabric is so disposed or arranged in the abrading member that the wires 10 in the bottom portion 2 thereof run diagonally to the length and width of the somewhat elongated or oblong and substantially rectangular abrading member and handle block 1, and in the central portion of the bottom 2 these wires cross each other at substantially right angles and extend obliquely or diagonally at substantially an angle of forty-five degrees. It is to be noted that this oblique or diagonal arrangement of the mesh-forming wires 10 extends from the bottom 2 through the rounded side corners 4 and into the sides 3, and similarly through the rounded end corners 6 into the ends 5.

The shape of the above described abrading member, including the slightly bulged bottom 2, the rounded side and end corners 4 and 6 and the inwardly sloping sides 3 and ends 5, together with the diagonal arrangement of the resilient mesh-forming wires 10 in the abrading member, give it a desirable amount of yieldability and resiliency, thereby rendering the use of the brush more pleasant as well as making it more effective, as will be readily understood.

The diagonal arrangement of the wires 10 also results in several important advantages. When the brush is oblong, or when it is of substantially rectangular shape, or both, as is shown in the drawings, the diagonal arrangement of the wires facilitates manufacture, causing the abrading member to preserve its original shape to a greater extent, and gives a more nearly equal size to the mesh throughout. Other important advantages of having the mesh-forming wires run diagonally or obliquely to the direction in which the brush is to be moved in use are that all of the wires, that is, the wires running in both directions, are brought into use at each abrading movement, thereby largely contributing to, and in fact substantially doubling, both the abrading action and the durability. Furthermore, the saw-like or oblique movement of the abrading wires 10 causes their sharp abrading edges to have a more effective abrading action, as will be readily understood.

The spacing of the bottom 2 and other parts of the abrading members from the handle block 1 prevents the mesh from filling or clogging with the loosened or abrading material, but in abrading some substances, such as some of those hereinafter mentioned, the abraded or dislodged material is likely to be fibrous or stringy and a considerable quantity of this stringy or fibrous material may pass through the mesh to the inside of the abrading member and cannot freely escape nor be readily washed out through the mesh. In order to prevent the possibility of trouble of this kind, the handle block 1 is provided with a large opening 11 through it to the inside of the abrading member, through which any material within the abrading member may be readily emptied out, or washed out.

The above described embodiment of the invention, in which the abrading member of the brush comprises hard sharp-angled or sharp-edged wires, such as the sharp-cornered square steel wires 10, is suitable for abrading soft metals, fibrous materials and substances over which round or non-angular wires would slide ineffectually; for example, this brush, having sharp abrading edges, which in effect have a cutting action, may be used for removing paint, such as from wood, metal, stone, brick, etc.; for smoothing woodwork, taking the place of sandpaper, which quickly becomes ineffective, by reason of filling or clogging, as well as wearing out, while the brush does neither; and in the kitchen for quickly and effectively removing the skins of apples, potatoes, and other fruits and vegetables.

Any one of the corner projections 9 is adapted to enter into and abrade any re-entrant angles, grooves or depressions in the surface operated upon and which cannot be reached effectively by the curved corners 4 and 6. For example, these projections 9 may be employed for removing the eyes of potatoes.

The handle block 1 is shown as undercut or chamfered around its edges at 12, to provide a firm grip for the fingers.

In the modified form of the invention shown in Figs. 7 and 8, the handle block 13 has no opening through it, and the abrading member 14 is formed of woven wire mesh fabric in which the mesh-forming wires 15 are non-angular, and in the construction shown in the drawings are round or of circular cross-section as shown in Fig. 8. That is to say, in the brush shown in Figs. 7 and 8, the mesh-forming wires 15 do not have sharp corners or angles, such as are shown on the wires 10 in Fig. 6; and the opening, such as the opening 11 shown in Figs. 2 and 4, is omitted from the handle block 13. In other respects than above noted, the construction of the abrading brush shown in Figs. 7 and 8 is the same as that described with reference to Figs. 1 to 6 inclusive, as indicated in Fig. 7, which corresponds to Fig. 4 of the first described construction. The projection 9 shown in Fig. 5 may therefore be considered as correctly representing a corresponding corner projection on the abrading member 14 shown in Fig. 7.

The embodiment of the invention shown in Figs. 7 and 8, in which the abrading member 14 comprises round mesh-forming wires 15, having smooth surfaces, is suitable for the abrasion of dry or nearly dry substances that will readily reduce to powder, and for removing such substances from surfaces or materials without cutting, scratching, tearing, or otherwise marring the underlying surface or material. For example, this form of the brush is particularly adapted for removing dried mud from clothing, leather or rubber boots and shoes, automobile tires, and stepping stones or steps, also for cleaning stoves and for removing rust and dirt from metal surfaces, and kalsomine and whitewash from walls. Also for scouring sinks, tubs and frying pans.

As abraded comminuted material may readily pass through the mesh to the large open space within the abrading member, the fabric will not fill or clog, and any such material passing to the inside may readily escape outward through the mesh.

Obviously other uses than those above particularly enumerated may be found for both of the above described embodiments of the invention.

In the further modification illustrated in Fig. 9, a portion of an abrading member 16 is shown in which expanded metal is employed, in which the mesh-forming bars are of rectangular cross-section, with the sharp corners thereof directed outwardly and providing sharp abrading edges. In other particulars the construction of the abrading brush having the abrading member 16 may be substantially the same or identical with that shown in Figs. 1 to 5 inclusive and hereinbefore described. The expanded metal mesh fabric is so disposed or arranged in the abrading member 16 that the abrading movement of the brush will take place diagonally and preferably transversely of the substantially diamond shaped meshes, thereby to produce more effective abrasion, as will be readily understood.

It is to be understood that the constructions shown in the drawings and herein particularly described as embodiments of the present invention may have various modifications made therein without departing from the spirit of the invention or the scope of the appended claims.

I claim:

1. An abrading device comprising a handle block and a foraminated metallic abrading member secured by its edges to said